United States Patent Office 3,822,213
Patented July 2, 1974

3,822,213
HALOGENATED HYDROCARBON COMPOSITIONS AND USES THEREOF
Peter Graham Johnson, Runcorn, England, assignor to Imperial Chemical Industries Limited, London, England
No Drawing. Filed Jan. 14, 1972, Ser. No. 218,017
Claims priority, application Great Britain, Jan. 21, 1971, 2,866/71
Int. Cl. C11d 7/22
U.S. Cl. 252—162       8 Claims

ABSTRACT OF THE DISCLOSURE

A cleaning composition which is a water-in-oil emulsion comprising one or more halogenated hydrocarbon solvents, from 5% to 70% by weight of water and a surface-active agent or mixture of surface-active agents free from fatty acids and salts thereof of which the 1% by weight solution in trichloroethylene has an interfacial tension against water of less than 10 dynes/cm. and a contact angle advancing against water on a polished stainless steel substrate which is lower than the contact angle of trichloroethylene and differs therefrom by not more than 30 degrees.

---

This invention relates to halogenated hydrocarbon compositions and uses thereof, and particularly to compositions comprising halohydrocarbon solvents and surface-active agents and uses of such compositions for cleaning and drying articles, for example machinery, instruments and other metal articles, plastic articles which are not affected by the solvent for example polyamides, polypropylene and polytetrafluoroethylene, textile materials and glass articles generally.

It is well known that liquid halogenated aliphatic hydrocarbons have the property of dissolving grease and oils, and that they can be used to effect degreasing of metals and other articles. It is also well known that the chlorinated aliphatic hydrocarbons, especially trichloroethylene and perchloroethylene, can be used to dry metal and other articles since the boiling solvents have the property of removing water from articles in the form of a constant boiling mixture with the solvent.

However, processes for drying articles using pure or conventionally stabilised trichloroethylene or perchloroethylene have the disadvantage that the surface of the article tends to become stained due to *in situ* drying of water droplets. This effect is particularly noticeable in the drying of polished metal and glass articles. In order to overcome this disadvantage it is necessary that the water droplets be removed from the surface of the article and incorporated in the solvent prior to their evaporation.

Moreover, whilst the halogenated hydrocarbon solvents, particularly 1,1,2-trichloro-1,2,2-trifluoroethane, trichloroethylene and perchloroethylene have the property of dissolving oils and greases they do not remove water-soluble contaminants and frequently do not remove particulate matter unless agitated by ultrasonic energy. It is clearly desirable to increase the potential uses of these solvents by using them in admixture with water, but simple physical mixtures of these solvents and water are not effective as cleaning agents.

The properties of the chlorinated hydrocarbon solvents can be modified to confer upon them the property of taking up water in the form of an emulsion of water in the solvent (a water-in-oil emulsion) by incorporating therein a suitable surface-active agent. Thus in Belgian Patent Specification No. 749,348 we have described and claimed a composition comprising a chlorohydrocarbon or bromohydrocarbon solvent and a metal, ammonium or amine salt of the monosulphonic acid derivative of a di-ester of a succinic acid in an amount of at least 0.5% by weight of the composition, and optionally water. Also in co-pending U.S. Patent Application No. 74,912, now U.S. Pat. No. 3,714,075 and corresponding French Patent Specification No. 7,036,011 we have described and claimed a composition comprising a chlorohydrocarbon solvent and a metal, ammonium or amine salt of an alkyl benzene sulphonic acid wherein the alkyl group contains from seven to fourteen carbon atoms, and optionally water. In each of the co-pending Applications it is described that compositions containing water are water-in-oil emulsions.

It is also known that the properties of the chlorofluorohydrocarbon solvents can be modified to confer upon them the property of taking up water in the form of a water-in-oil emulsion. Thus in U.K. Patent Specification No. 1,157,190, which corresponds to U.S. Pat. 3,577,348 we describe and claim a composition comprising a chlorofluorohydrocarbon solvent and a sodium, ammonium or amine salt of a monosulphonic acid derivative of a di-ester of a succinic acid, and optionally water. Also in U.K. Patent Specification No. 1,258,757 we describe and claim a composition comprising a chlorofluorohydrocarbon solvent and an amine salt of undecyl or tridecyl benzene sulphonic acid, and optionally water. In each case compositions containing water are water-in-oil emulsions.

The compositions hereinbefore described which are water-in-oil emulsions may all be used to clean a wide variety of articles. However, they all suffer from the disadvantage that they cannot be employed successfully at ordinary temperatures without ultrasonic agitation or at the boil to clean articles upon which is deposited particle matter, for example polishing, lapping and grinding abrasives, dust, swarf and the fine deposits generally refered to as smut and bloom. Moreover, such fine particulate deposits are not removed by rinsing the cleaned article in pure halogenated hydrocarbon solvent. The deposit must, however, be removed, for example if the article is subsequently to be coated, electroplated, lacquered or painted, and it is usually removed by hand-wiping or other mechanical actions or by using utlrasonically-agitated solvents.

A cleaning composition which obviates the above disadvantages is described and claimed in U.K. Patent Specification No. 1,049,220. This composition comprises a chlorinated hydrocarbon solvent, water, oleic acid and ammonia or a compound which liberates ammonia. The composition can be employed at ordinary temperatures without ultrasonic agitation to clean a wide variety of articles but it suffers from the serious disadvantage that upon rinsing of cleaned articles in the vapour of a chlorinated hydrocarbon solvent directly after cleaning there generally results "spotting" of the article. In order that the cleaned articles may be painted or electroplated it is necessary to remove the spots by hand-wiping or by means of an ultrasonically-agitated solvent. Since vapour rinsing is by far the preferred method of rinsing, a composition which did not result in "spotting" would clearly be advantageous and we have now found such a composition.

According to the present invention we provide a cleaning composition which is a water-in-oil emulsion comprising one or more halogenated hydrocarbon solvents, from 5% to 70% by weight of water and a surface-active agent or mixture of surface-active agents free from fatty acids and salts thereof of which the 1% by weight solution in trichloroethylene has an interfacial tension against water of less than 10 dynes/cm. and a contact angle advancing against water on a polished stainless steel substrate which is lower than the contact angle of trichloroethylene and differs therefrom by not more than 30 degrees.

The compositions of the invention contain water and those containing appreciable quantities of water are milky in appearance and are useful as cleaning agents for articles immersed therein. Articles treated therewith are freed from grease and oils and water-soluble substances and they can be freed from fine particulate matter without the need to agitate the composition ultrasonically.

We have found that for practical cleaning purposes the amount of water which is emulsified in the solvent should preferably be at least 10% by weight but need not be greater than about 60% by weight of the resulting emulsion. Our preferred compositions contain about 40% by weight of water. The compositions should contain at least 0.1% by weight of the emulsion of the surface-active agent or mixture of agents, preferably at least 0.5% by weight and especially about 1% by weight. The amount of the surface-active agent will usually be less than 10% by weight of the emulsion although larger amounts than this may be used if desired; increasing the amount above 20%, however, appears to offer no advantages and merely increases the viscosity of the emulsion.

Any surface-active agent may be employed of which the 1% by weight solution in trichloroethylene has the specified properties. Preferably the interfacial tension is greater than 1 dyne/cm. and the contact angle difference is less than 25°. A variety of anionic, cationic and non-ionic surface-active agents may be employed and examples of particularly suitable agents are substituted imidazolines such as 1-aminoalkyl-2-alkylimidazolines and 1-hydroxyalkyl-2-alkylimidazolines wherein the 2-alkyl group contains at least twelve carbon atoms. Examples of other surface-active agents which may be used are condensates of ethylene oxide and propylene oxide and phosphate esters of ethoxylated aliphatic and aromatic hydroxyl compounds.

Mixtures of two or more surface-active agents may be employed and it is to be understood that a surface-active agent which does not fulfill the specified conditions of interfacial tension and contact angle when used alone may nevertheless be present in a satisfactory mixture of surface-active agents. Thus, for example, sorbitan monooleate does not have the specified properties when used alone but it may be used with advantage in admixture with another surface-active agent, for example an imidazoline derivative. The advantage of the non-ionic surface-active agent in this case is that it results in an increase in the stability and cleaning power of the resulting emulsion. When used solely for this purpose the non-ionic surface-active agent is preferably present in an amount of not greater than the amount of the agent with which it is mixed and usually will be less than 50% by weight of the other surface-active agent.

The substituted imidazolines which may be used have the formula

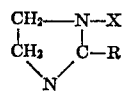

wherein X is an aminoalkyl group or a hydroxyalkyl group and R is a saturated or unsaturated aliphatic hydrocarbon group containing at least twelve carbon atoms. We prefer to employ the derivative wherein X is —$CH_2CH_2NH_2$ or —$CH_2$—$CH_2OH$ and R contains seventeen carbon atoms.

Other substances may be incorporated in the compositions in addition to water. Examples of such other substances are ammonia, hydrogen peroxide, phosphoric acid, hydrochloric acid and metal chelating agents such as hydroxyacids, for example citric acid and tartaric acid. Dyestuffs also may be incorporated in the compositions. The amount of such substances which can be tolerated in emulsions of water in the chlorinated hydrocarbon solvent is limited since their presence increases the rate at which phase separation occurs in the emulsion. The maximum amount of the substance which can be tolerated depends upon the particular substance and can be determined by simple experiment.

The halogenated hydrocarbon solvent constituent of the compositions can be any liquid halogenated hydrocarbon solvent, especially a haloaliphatic hydrocarbon for example 1,1,2-trichloro-1,2,2-trifluoroethane, trichloroethylene, perchloroethylene, 1,1,1-trichloroethane and methylene dichloride.

If required the compositions of the invention may contain one or more stabilisers. Stabilisation may be required against decomposition of the solvent induced by the presence of metals, (especially aluminium and zinc) and/or by heat and light. For example it may be necessary to stabilise the solvent to inhibit attack on metal articles being cleaned or dried or on the materials of construction of the cleaning or drying and rinsing tanks. Any of the known stabilising additives for halogenated hydrocarbon solvents may be employed to prevent these decomposition reactions. Examples of such stabilising additives are nitroalkanes and other alkyl and aryl nitro-compounds, epoxides, amines for example triethylamine, alkanolamines, cyclic ethers, ketones, substituted phenols, pyrroles and alcohols for example propargyl alcohol. Usually the total amount of stabilisers added will not exceed 10% by weight of the composition. In addition to stabilisers, compounds known to inhibit tarnishing of copper and brass may be added.

Cleaning or drying of articles using the appropriate composition can be carried out simply by immersing the articles in the composition for a suitable period of time, for example 60 seconds, although shorter periods may be sufficient if the composition is agitated. The article is then removed and will generally be rinsed in a pure solvent (conveniently the same solvent as is used in the composition) to remove traces of the surface-active agent or other additives which may have become deposited on the article. It is preferred to spray the composition onto the workpiece and/or to agitate the composition mechanically. The compositions are conveniently used at about room temperature or at slightly elevated temperatures for example up to about 40° C. After cleaning, the first rinse may be carried out in cold solvent although we prefer to employ boiling solvent. Preferably, where the first rinse is carried out in cold solvent, a further rinse in boiling solvent or in solvent vapour is carried out since this enables the solvent to evaporate rapidly when the article is withdrawn.

The articles, after treatment to clean or dry them have surface-active agent deposited on them and this deposit is removed in the rinse treatment.

The compositions of the invention can be used to clean metal (though special additives may be necessary to prevent corrosion of the metal), insoluble plastics, glass, textile materials and other articles and the water-free or water-deficient compositions can be used to dry such articles. Cleaning results in the removal of grease, oil, water-soluble dirt and particulate matter. Complete removal of water from the articles is achieved also.

The invention is illustrated but in no way limited by the following Examples in which all parts and percentages are by weight unless otherwise stated:

EXAMPLE 1

A composition was prepared to the formulation:

|  | Parts |
|---|---|
| Trichloroethylene | 60 |
| Water | 39 |
| Surface-active agent | 1 |
|  | 100 |

The surface-active agent was 1-aminoethyl-2-heptadecyl imidazoline, available under the trade name "Casamine" S.

The composition was used to clean mild steel pressings for storage units by spraying the composition onto the pressings at 5 p.s.i. for one minute. The pressings were then immersed in boiling trichloroethylene for half a minute to rinse them. The pressings were cleaned sufficiently to enable them to be painted and hand-wiping was unnecessary.

EXAMPLE 2

A composition prepared as in Example 1 was employed to remove lapping abrasive from bearing balls by agitating them in the composition for two minutes followed by rinsing in boiling trichloroethylene for one minute. The balls appeared completely clean, and the lapping compound had been removed to a level usually achieved only using ultrasonic agitation of the cleaning solvent.

EXAMPLE 3

A composition prepared as in Example 1 was used to clean blades destined for handsaws and circular saws prior to coating them with polytetrafluoroethylene. The blades were immersed in the composition for two minutes during which time the composition was agitated by means of a recirculating pump system. The blades were then rinsed in boiling trichloroethylene for one minute after which surprisingly they could be coated without further preparation.

EXAMPLE 4

A composition was prepared and used as in Example 2 except that 1-hydroxyethyl - 2 - heptadecyl imidazoline, available under the trade name "Casabine" SH was employed instead of the aminoethyl derivative. The results were the same as obtained in Example 2.

EXAMPLE 5

A composition was prepared and used as in Example 2 except that as surface-active agent there was employed a 4:1 w./w. mixture of 1-aminoethyl-2-substituted imidazoline (the 2-substituent is an unsaturated $C_{17}$ radical) available under the trade name "Casamine" O and sorbitan mono-oleate available under the trade name Span 80. The results were the same as were obtained in Example 2.

EXAMPLES 6 TO 15

Each of the following surface-active agents and mixtures of surface-active agents were dissolved in trichloroethylene at room temperature to produce a 1% w./w. solution:

| Ex. No. | Surface-active agent(s) | Trade name(s) |
| --- | --- | --- |
| 6 | 40:60 polyoxyethylene/polyoxypropylene glycol. | Pluronic P104. |
| 7 | A phosphate ester of an ethoxylated aromatic hydroxyl compound. | Ultraphos 41. |
| 8 | do | Ultraphos 11. |
| 9 | 1-hydroxyethyl-2-heptadecyl imidazoline. | Casamine SM. |
| 10 | 1-hydroxyethyl-2-($C_{21}$ radical)-imidazoline. | Casamine BH. |
| 11 | 1-aminoethyl-2-heptadecyl imidazoline (the heptadecyl group is branched). | Casamine IS. |
| 12 | Casamine IS plus sorbitan mono-oleate. | Casamine IS/Span 80 (3:1 ratio). |
| 13 | 1-hydroxyethyl-2-($C_{17}$ unsaturated) imidazoline plus sorbitan mono-oleate. | Crodazoline O/Span 80 (4:1 ratio). |
| 14 | Crodazoline O plus sorbitan mono-oleate. | Crodazoline O/Crill 4 (4:1 ratio). |
| 15 | | Casamine IS/Crill 4 (4:1 ratio). |

In each Example the interfacial tension against water of the 1% solution in trichloroethylene was determined by the standard procedure except that the ring was drawn upwardly through the interface rather than being lowered through the interface. The test is described in "The Physics and Chemistry of Surfaces" by N. K. Adams, 3rd Edition, pages 2 and 7.

The contact angle of the solution advancing against water on a polished (mirror finish) stainless steel substrate was determined by the standard procedure also described in the textbook by N. K. Adams in pages 178 and 188.

The results are shown in Table I in which the surface-active agents are identified by their trade names, for convenience, and $\Delta\theta$ is the difference between the contact angle of the solution and that of trichloroethylene (71°).

TABLE I

| Ex. No. | Surface-active agent | Interfacial tension, dynes/cm. | Contact angle (degrees) | $\Delta\theta$ |
| --- | --- | --- | --- | --- |
| 6 | Pluronic P104 | 7.4 | 62 | 9 |
| 7 | Ultraphos 41 | 1.9 | 57 | 14 |
| 8 | Ultraphos 11 | 1.5 | 41 | 30 |
| 9 | Casamine SH | 1.8 | 60 | 11 |
| 10 | Casamine BH | 1.9 | 60 | 11 |
| 11 | Casamine IS | 1.0 | | |
| 12 | Casamine IS/Span 80 | 1.0 | 54 | 17 |
| 13 | Crodazoline O/Span 80 | 0.9 | 55 | 16 |
| 14 | Crodazoline O/Crill 4 | 1.0 | 50 | 21 |
| 15 | Casamine 15/Crill 4 | 1.7 | 43 | 28 |

Each surface-active agent or mixture of agents was then formulated with trichloroethylene and water:

|  | Parts |
| --- | --- |
| Trichloroethylene | 60 |
| Surface-active agent | 1 |
| Water | 39 |
| | 100 |

The surface-active agent was dissolved in the trichloroethylene at room temperature and the water was added, with stirring, to produce an emulsion having a milky appearance.

Each composition was used to clean a variety of plastics, metal and glass articles (including, for example, polished stainless steel cutlery, aluminium and zinc die-castings, mild steel pressings, glass cosmetic jars and phenol-formaldehyde switch housings smeared with molybdenum disulphide. The articles were immersed for about one minute in the composition (which was agitated throughout) and after cleaning in this way were rinsed by immersion in trichloroethylene vapour for thirty seconds. After rinsing, the articles were free from "spotting" and there was no visible sign of particle matter on them.

Each composition also was subjected to the following standard test procedure:

A polished stainless steel spoon blank coated with jewellers rouge was degreased by immersion for twenty seconds in trichloroethylene vapour. The blank then was immersed in the composition and moved to-and-fro by hand for two minutes. The blank finally was rinsed by immersion in trichloroethylene vapour for thirty seconds.

In each case there was no visible sign of jewellers rouge on the cleaned spoon blanks. The cleaned blanks were wiped once with a tissue and in each case only a very faint stain resulted on the tissue.

Mild steel television stands and mild steel lawnmower components cleaned with the composition defined in Example 5 have been painted with the conventional paint and in each case better adhesion of the paint coating to the substrate was obtained than is obtained by painting substrates which were cleaned in the conventional manner including a final hand-wiping operation to remove particle matter.

For purposes of comparison compositions were prepared to the above formulation using the following surface-active agents:

| | Trade name |
| --- | --- |
| Sodium dinonyl sulphosuccinate | Alcopol ON. |
| A nonyl phenol/ethylene oxide condensate: | |
| (25 moles ethylene oxide) | Ethylan HP. |
| (6.5 moles ethylene oxide) | Ethylan 77. |
| Dibutyl naphthalene sulphonic acid | Nansa BX Acid. |
| Isopropylamine dodecyl benzene sulphonate | Nansa YS 94. |
| Sodium dinonyl sulphosuccinate+a nonyl phenol/ethylene oxide condensate (2.6:1 ratio) | Alcopol ON/ Ethylan DP. |

A variety of articles were treated with each composition as described above. In no case were the articles cleaned satisfactorily so that they were suitable for painting without first being hand-wiped to remove particle matter.

The properties of these surface-active agents were determined as described above using a 1% solution of the surface-active agent in trichloroethylene.

TABLE II

| Surface-active agent (1% W./W. solution) | Interfacial tension (dynes/cm.) | Contact angle (degrees) | Δθ (approximate) |
|---|---|---|---|
| Alcopol ON | 3.1 | Spreads [1] | |
| Ethylan HP | 4.5 | 39 | 32 |
| Ethylan 77 | 12.0 | 28 | 43 |
| Nansa BX acid | <1.0 | Spreads | |
| Nansa YS 94 | <1.0 | ..do | |
| Alcopol ON/Ethylan DP (2.6:1 ratio) | <1.0 | ..do | |

[1] Spreads denotes a contact angle of less than 15°.

We claim:

1. A cleaning composition containing a water-in-oil emulsion consisting essentially of at least one halogenated hydrocarbon solvent selected from the group consisting of 1,1,2-trichloro - 1,2,2 - trifluoroethane, trichloroethylene, perchloroethylene, 1,1,1-trichloroethane and methylene dichloride, from 5% to 70% by weight of water and from 0.1% to 10% by weight of at least one surface-active agent which is free from fatty acids and fatty acid salts, and wherein a 1% by weight solution of the surface-active agent in trichloroethylene has an interfacial tension against water of less than 10 dynes/cm. and a contact angle advancing against water on a polished steel substrate which is lower than the contact angle of trichloroethylene and differs therefrom by not more than 30 degrees.

2. A cleaning composition as claimed in claim 1 wherein said interfacial tension is greater than 1 dyne/cm. and the difference in contact angles is not more than 25 degrees.

3. A composition as claimed in claim 1 wherein the amount of water which is emulsified in the solvent is from 10% to 60% by weight of the emulsion.

4. A composition as claimed in claim 1 wherein the amount of the surface-active agent or mixture of surface-active agents is from 0.5% to 10% weight of the emulsion.

5. A composition as claimed in claim 1 wherein there is employed a mixture of an ionic surface-active agent and a non-ionic surface-active agent wherein the amount of the non-ionic surface-active is less than 50% by weight of the mixture of surface-active agents.

6. A composition as claimed in claim 1 wherein the surface-active agent or one of the surface-active agents is a substituted imidazoline of the formula:

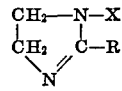

wherein X is an aminoethyl group or a hydroxyethyl group and R is a saturated or unsaturated aliphatic hydrocarbon group containing from twelve to twenty-one carbon atoms.

7. A composition as claimed in claim 1 wherein the solvent is a chlorinated aliphatic hydrocarbon.

8. A method of cleaning articles which comprises immersing them in a composition as claimed in claim 1.

References Cited
UNITED STATES PATENTS

| 2,155,877 | 4/1939 | Waldmann et al. | 260—309.6 |
| 2,520,102 | 8/1950 | Tryon | 260—309.6 |
| 2,622,067 | 12/1952 | White et al. | 260—309.6 |
| 2,792,404 | 5/1957 | Garmaise et al. | 252—357 |
| 3,577,348 | 5/1971 | Clementson | 252—355 |
| 3,658,717 | 4/1972 | Graff | 252—312 |
| 3,715,186 | 2/1973 | Anninos | 260—309.6 |

WILLIAM E. SCHULZ, Primary Examiner

U.S. Cl. X.R.

134—40; 252—170